United States Patent [19]

Mazzocchi

[11] Patent Number: 5,333,540
[45] Date of Patent: Aug. 2, 1994

[54] PORTABLE BARBEQUE

[76] Inventor: Carlos Mazzocchi, 239 Doncaster Ave., Kingsford NSW 2032, Australia

[21] Appl. No.: 960,443
[22] PCT Filed: Jun. 27, 1991
[86] PCT No.: PCT/AU91/00275
§ 371 Date: Feb. 2, 1993
§ 102(e) Date: Feb. 2, 1993
[87] PCT Pub. No.: WO92/00034
PCT Pub. Date: Jan. 9, 1992

[30] Foreign Application Priority Data

Jun. 29, 1990 [AU] Australia ............... PK0912

[51] Int. Cl.⁵ .......................... A47J 37/07; F24B 3/00
[52] U.S. Cl. .................... 99/421 H; 99/446; 99/449; 99/450; 126/9 R; 126/25 R
[58] Field of Search ............... 99/419, 421 A, 421 H, 99/421 HH, 421 R, 339, 340, 449, 450, 480, 400, 482, 481, 444-446; 126/25 R, 9 R, 25 M; 220/6, 7

[56] References Cited

U.S. PATENT DOCUMENTS

| | | | |
|---|---|---|---|
| 2,497,994 | 2/1950 | Jones | 126/9 R |
| 2,559,243 | 7/1951 | Brown | 126/9 R |
| 2,627,854 | 2/1953 | Sava | 126/9 R |
| 3,249,101 | 5/1966 | Weissman et al. | 99/449 |
| 3,809,053 | 5/1974 | Navarro | 126/25 R |
| 4,040,343 | 8/1977 | DeLucchi | 99/421 H |
| 4,208,959 | 6/1980 | Schmidt | 99/421 HV |
| 4,211,206 | 7/1980 | Darbo | 99/449 |
| 4,598,690 | 7/1986 | Hsu | 126/25 R |
| 4,770,091 | 9/1988 | Vaughn | 99/421 H |
| 4,924,844 | 5/1990 | Bransburg | 126/9 R |
| 5,105,726 | 4/1992 | Lisker | 99/340 |
| 5,163,414 | 11/1992 | Haynes, Jr. | 126/9 R |

FOREIGN PATENT DOCUMENTS

| | | |
|---|---|---|
| 224947 | 3/1959 | Australia . |
| 1130685 | 8/1982 | Canada . |
| 2643025 | 3/1978 | Fed. Rep. of Germany . |
| 3302838 | 3/1984 | Fed. Rep. of Germany . |
| 7402769 | 8/1975 | France . |
| 7528272 | 4/1976 | France . |

Primary Examiner—Timothy F. Simone
Attorney, Agent, or Firm—Richard C. Litman

[57] ABSTRACT

A free standing collapsible, portable barbeque (1) adapted to be moved between a closed/folded configuration and an open/assembled configuration and from an open/assembled configuration to a closed/folded configuration thereby assuming the character of a portable suitcase; the barbeque comprising a substantially cubic receptacle (2) supported by legs (5, 6, 7 and 8) pivotally attached to the underside of the receptacle so that they fold inwardly to a plane parallel with the base of the receptacle.

A lid (15) is pivotally connected to the receptacle which when open acts as a rear baffle and when closed as a cover for the receptacle.

The barbeque has first and second side baffles (11 and 12) which are adapted to move independently of the lid (15) each pivotally connected to the base of the the receptacle and between a sidewall of the receptacle; and a well (37) formed within said receptacle which acts as a cooking waste trap.

Supporting means (14) on the first and second side baffles to enable adjustable support of one or more cooking trays and/or a rotisserie.

There are ports to enable the injection of gas to a gas operated heat source or an area to receive dry combustibles as a heat source within the receptacle.

There are fastener means on the lid or receptacle to enable the lid to be fastened to the receptacle when the barbeque is in the folded configuration.

23 Claims, 10 Drawing Sheets

PORTABLE BARBEQUE

BACKGROUND OF THE INVENTION

The present invention relates to portable barbeques and more particularly relates to a barbeque adapted to move between an open working configuration and a closed portable configuration having specially configured baffles to enable compact folding of the barbeque.

There are in existence a great variety of barbeques foldable, transportable and fixed however, none of the previously known foldable barbeques have the facility whereby they can be folded with the compactness of a suitcase. There are in existence barbeques which have a facility for portability however, the known barbeques which are presently in the market place are cumbersome in that they cannot be readily folded and easily carried. The present invention seeks to provide a foldable and manually transportable barbeque whereby the barbeque is adapted to be folded into a compact small shape approximating the size of a medium to small sized suitcase. Barbeques which are not fixed into a particular position permanently are generally intended to be transported after disassembly. The previously known barbeques can be dismantled into various component pieces to facilitate transportation however, they suffer from the attendant disadvantage that time and effort must be spent in re-assembling the barbeque each time it is to be used and disassembly following use.

It is therefore desirable that a portable barbeque be provided whereby upon the application of a simple folding technique the barbeque can move between a closed configuration and an open configuration resulting in the barbeque standing stably on a pedestel legs and also having means to protect the heat source from drafts which often occur with barbeques used in the open air.

It has not hitherto previously been known to provide a barbeque having in one composite foldable unit stable leg support means, means to prevent drafting over the cooking area and means to enable compact folding and transportation of the barbeque. Foldability to the closed configuration furthermore does not necessarily require removal of parts according to a preferred embodiment of the present invention. The baffles utilized in the present invention are configured to include the following; adjustable support for the cooking trays, support for and accommodation of gas burners, restraining means to provide rotational stability in the unfolded configuration with those means being displaceable to allow folding of the baffles and protection of the cooking flame from wind drafts.

In one broad form the present invention comprises a portable barbeque adapted to be moved between a closed/folded configuration and open or assembled configuration characterized in that the barbeque when in the closed/folded configuration comprises a cubic body having a carriage means attached thereto and in the assembled or open configuration comprising a main frame member having legs pivotally attached thereto, at least one tray member adapted for releasable insertion in, about or on said mainframe, and means for preventing drafts in or around the cooking area when said barbeque is fully assembled and means for encasement of the said means and said members when said barbeque is in the closed/folded configuration.

In another broad form the present invention comprises:

A free standing collapsible, portable barbeque adapted to be moved between a closed/folded configuration and an open/assembled configuration and from an open/assembled configuration to a closed/folded configuration thereby assuming the character of a portable suitcase; said barbeque comprising a substantially cubic receptacle supported by legs pivotally attached to the underside of said receptacle so that they fold inwardly to a plane parallel with the base of said receptacle, a lid pivotally connected to the receptacle which when open acts as a rear baffle and when closed as a cover for said receptacle, first and second side baffles which are adapted to move independently of said lid each pivotally connected to the base of the said receptacle and between a sidewall of the receptacle; and a well formed within said receptacle which acts as a cooking waste trap, supporting means on said first and second side baffles to enable adjustable support of one or more cooking trays and/or a rotisserie, means to enable the injection of a gas operated heat source or means to receive dry combustibles as a heat source within said receptacle, fastening means on said lid or receptacle to enable said lid to be fastened to said receptacle when said barbeque is in the folded configuration.

In one preferred embodiment the barbeque comprises an essentially rectangular shaped receptacle having two or four support legs which are hingedly attached and foldable into the underside of the frame member. The receptacle also has pivotally attached thereto, side panels and a back panel which are adapted to act as draft baffles. The side panels are also adapted with means to receive at least one tray spanning therebetween to provide either a cooking surface or food support surface.

In an alternative embodiment the present invention comprises a portable barbecue including a rectangular shaped receptacle with legs hingedly attached to the bottom thereof so as to be folded together against the bottom of said receptacle, a fuel tray member adapted to be inserted on said receptacle, side flaps or baffles, a grill member adapted to be placed over said fuel tray on projections provided on said side flaps or baffles at various heights above said fuel tray, said baffles being hinged at the sides of said receptacle so to be plied against said grill member for transport, and a cover member, said cover being adapted to engage with gripping means at the rear side of said receptacle to so anchor the cover.

BRIEF DESCRIPTION OF THE DRAWINGS

The present invention will now be described in more detail according to a preferred embodiment and with reference to the accompanying illustrations wherein.

DETAILED DESCRIPTION OF THE PREFERRED EMBODIMENTS

Figure 1:
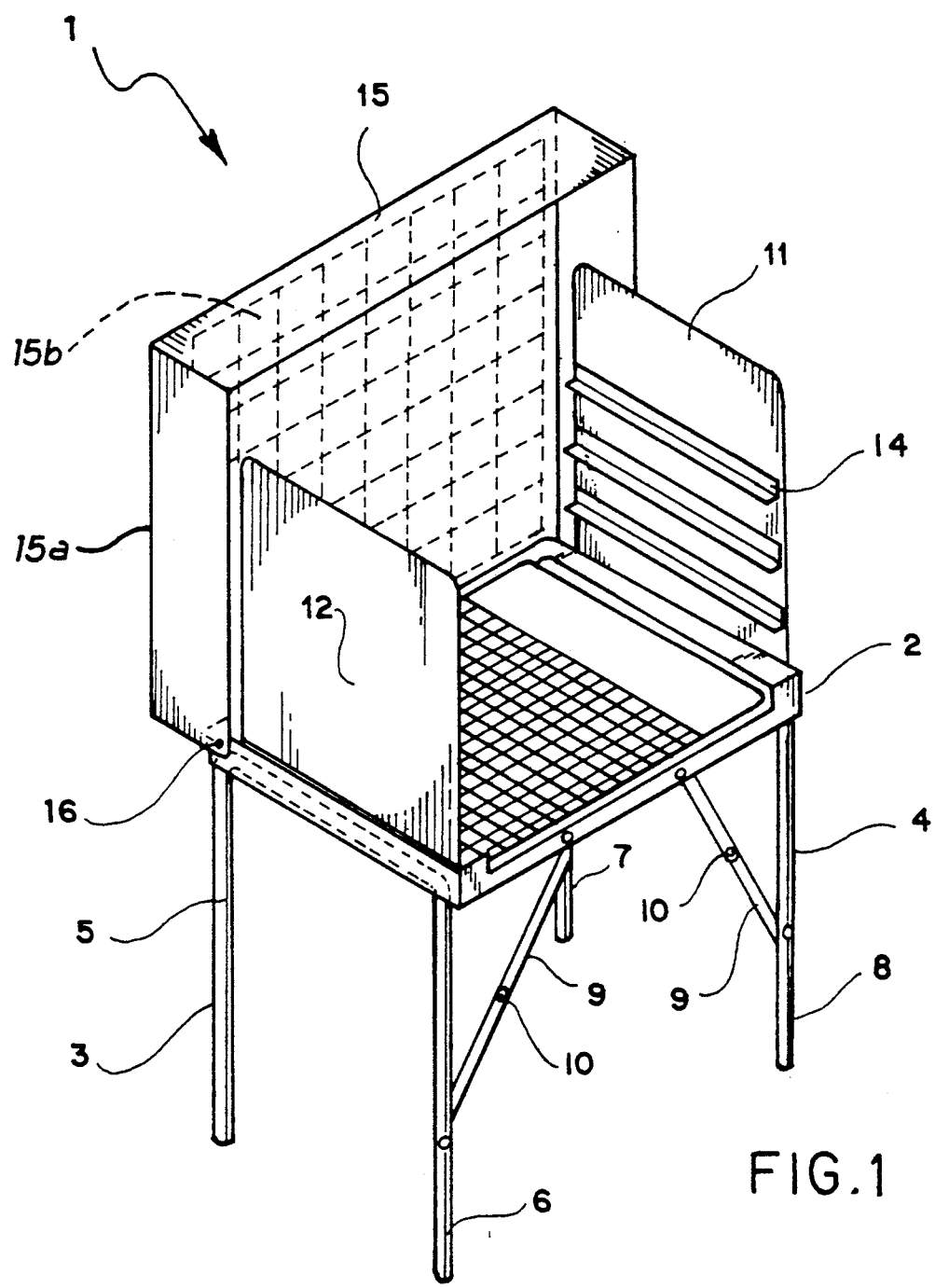
FIG. 1 discloses a perspective view of the portable barbeque according to one embodiment of the present invention.
Figure 6:
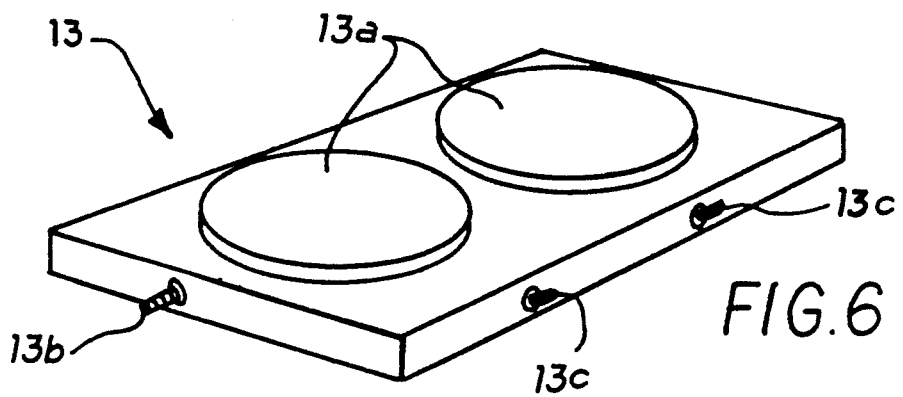
FIG. 6 shows a perspective view of the gas burner which may be used as a fuel tray.

Referring to FIG. 1 there is shown a perspective view of a portable barbeque 1 in the open or assembled configuration according to the preferred embodiment. In the preferred embodiment the barbeque comprises a main receptacle 2 having depending therefrom preferably two leg assemblies 3 and 4. The leg assemblies are adapted to be folded in apposition with or within said receptacle 2. In the preferred embodiment, each of the leg assemblies 3 and 4 comprise a substantially U-shaped member with the legs 5 and 6 providing support on one end of the main frame and the legs 7 and 8 providing support at the opposite end of the main frame. Each of the leg assemblies 3 and 4 are adapted to pivot about a pivot point so they may be folded into an underside cavity formed within the receptacle 2 or flush with the bottom surface of the receptacle. Each leg assembly is fitted with at least one articulated gusset 9 to provide rigid support when the legs are in the open configuration. Collapsing of the leg members is a simple matter of articulating gusset members 9 about pivot point 10 on each of the gusset members. The receptacle 2 also has pivotally attached to it at least two baffles 11 and 12 which have a number of purposes. The first purpose is to provide protection from the wind when the barbeque is used in the open. A second benefit of the two baffles is to provide a support for cooking trays which are adapted to span between the said baffles 11 and 12. A further ancillary advantage is to provide protection against lateral spatter. The sample cooking tray 13 is shown in FIG. 6 of the drawings. Multiple trays may also be inserted above tray 13. The tray/s spans between the baffles by seating on supports 14 which are spaced to enable optional selection of altitude of the cooking plate above the heat source. The cooking tray 13 may optionally incorporate gas burners.

In addition, the portable barbeque is adapted with a lid member 15 which is pivotally connected to the receptacle 2 preferably at the rear relative to the position of the user during use of the barbeque. In the preferred embodiment the lid 15 is connected by means of pins 16 which enable pivotal movement of the lid over the main frame when the barbeque is to be folded.

Figure 8:
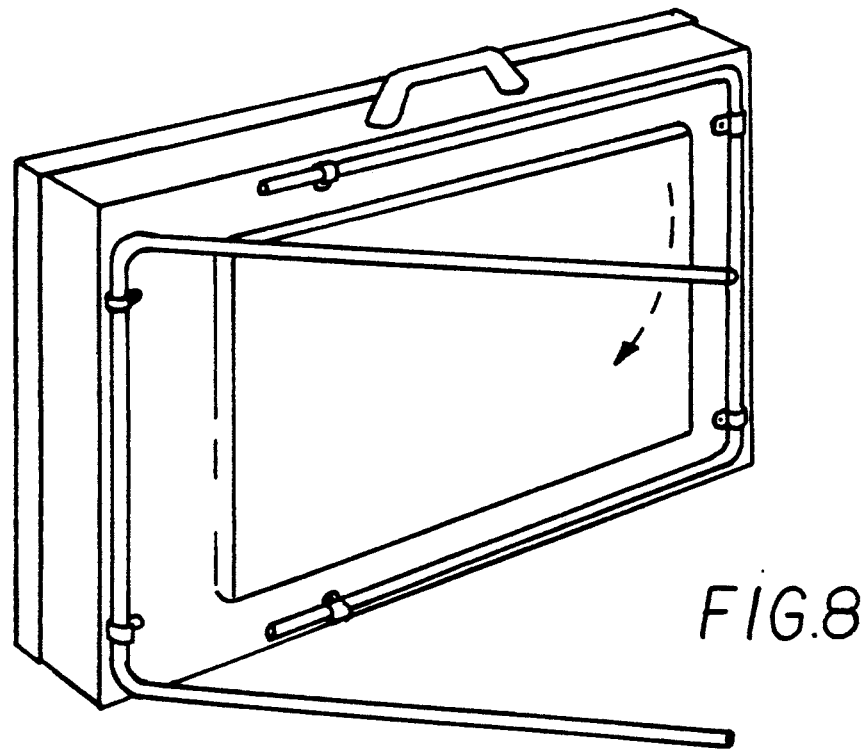
FIG. 8 shows the barbeque in the collapsed/folded configuration.

When the barbeque is to be folded the legs are collapsed by collapsing of gusset 9 about pivot pin 10. This enables the leg assemblies 3 and 4 to be inwardly folded such that they fit underneath the receptacle 2. The baffles 12 and 14 are folded downwardly such that they overly and fit within the receptacle periphery. In an alternative embodiment the baffles may be releasably removed. Finally the lid member 15 is folded down over the top of the receptacle. The leg assemblies and baffles 12 and 14 are folded to complete the folding of the barbeque. The barbeque assembly is now ready to be transported. FIG. 8 shows the barbeque in its folded/closed configuration.

Figure 4:
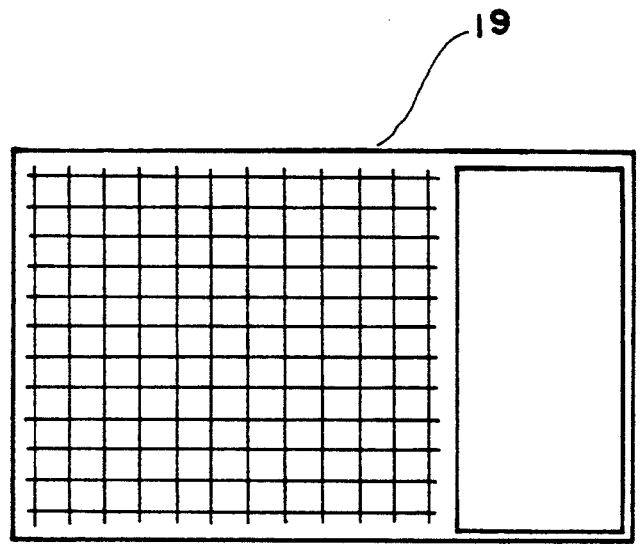
FIG. 4 shows a typical grill which is adapted to engage with support means on the side plate baffles.
Figure 5:
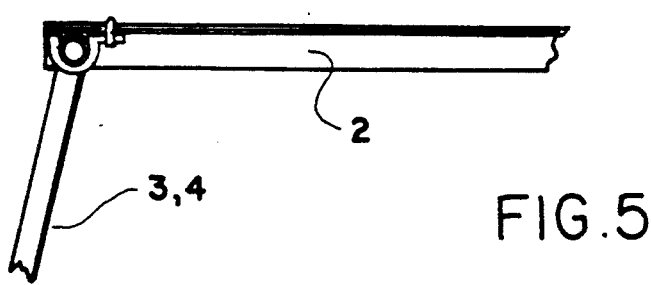
FIG. 5 shows one means of annexation of the leg assembly of FIG. 3.
Figure 7:
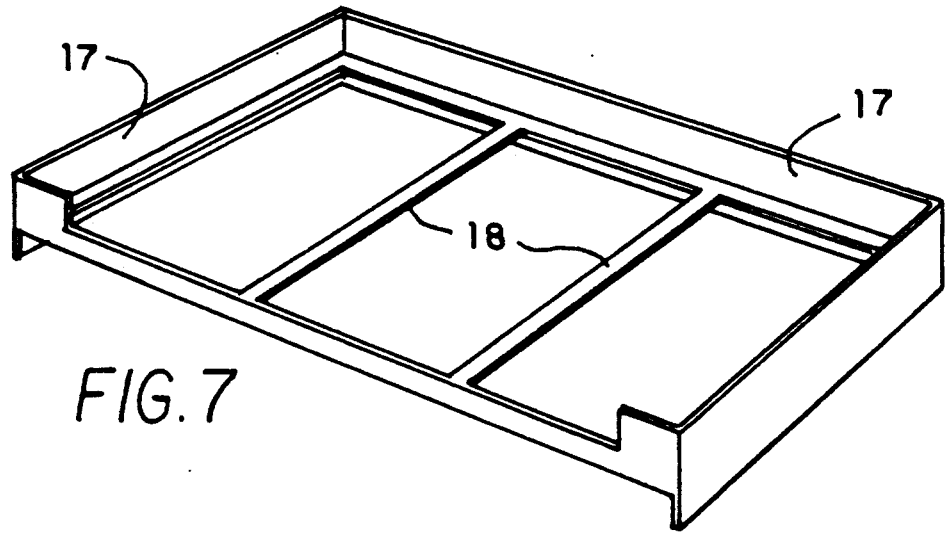
FIG. 7 is a perspective view of the receptacle of the barbeque.

FIG. 7 shows the receptacle 2 from a perspective view according to one embodiment of the invention. The receptacle 2 is shown with peripheral wall members 17 and optional intermediate support beams 18 to provide support for a mesh material 19 as shown in FIG. 4 which overlies the receptacle during the cooking procedure. The mesh is preferably detachably affixed to the receptacle for purposes such as cleaning.

Figure 2:
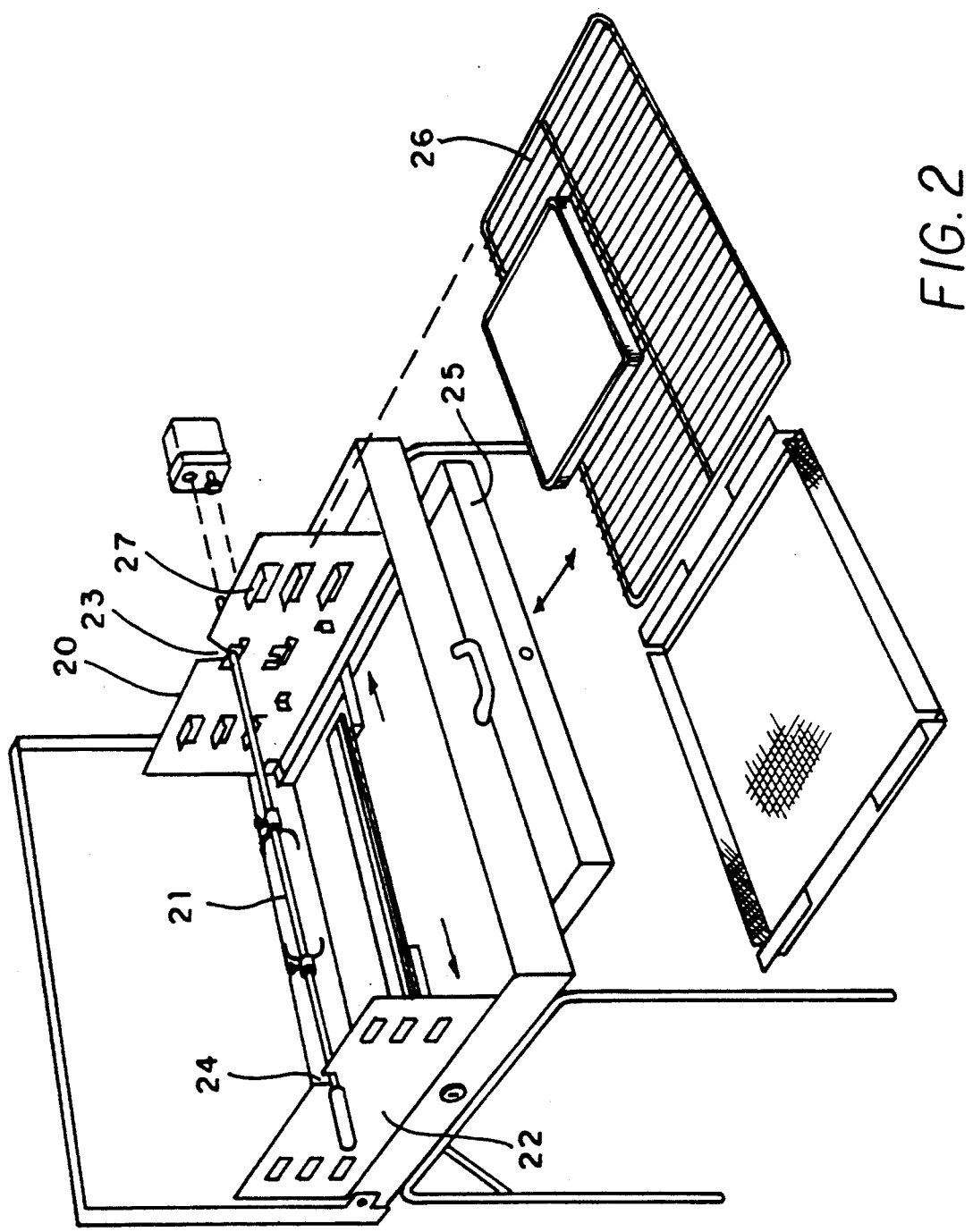
FIG. 2 shows an exploded view of the portable barbeque according to one embodiment of the present invention.
Figure 3:
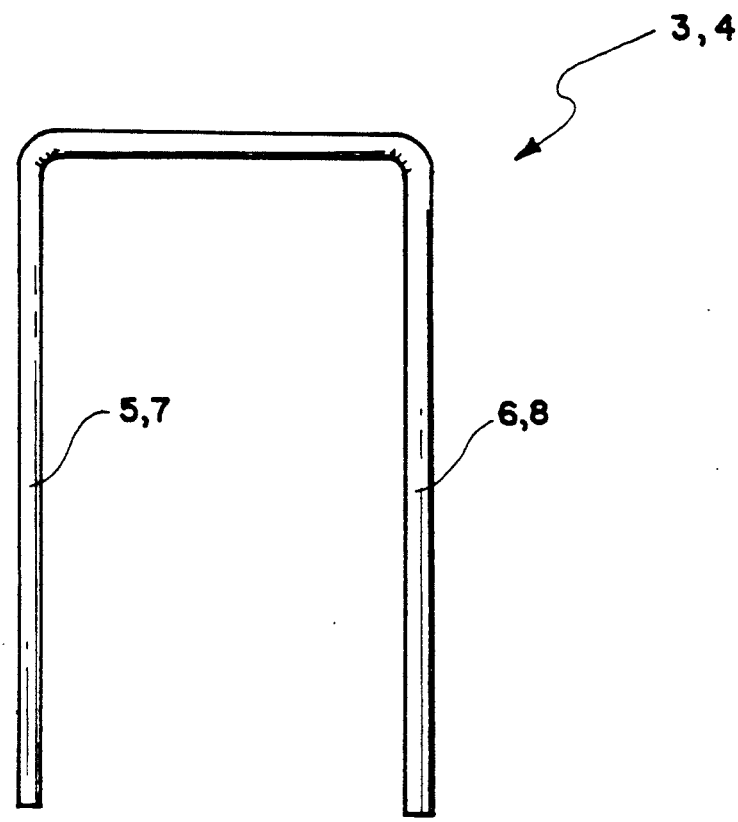
FIG. 3 shows a side view of a leg assembly of the barbeque according to one embodiment.

FIG. 2 shows an exploded view of the barbeque of the present invention according to an alternative embodiment to that previously described.

The embodiment shown in the exploded view in FIG. 2 is substantially the same in operation as that shown in FIG. 1 however, in this embodiment baffle plate 20 is adapted for longitudinal movement along the receptacle 2 in order to adjust the span-between the baffles thereby allowing a change in the supports for a spit 21 which may be optionally located on each baffle.

Each of the baffles 20 and 22 are adapted with slots 23 and 24 respectively, to provide a seating for the spit rod 21. In the preferred embodiment the portable barbeque is adapted with a slidable tray or well 25 which is included to catch any cooking residue resulting from the use of the barbeque. The tray 25 may be removed in a draw-like manner. In this embodiment the bracket means 27 for supporting the tray 26 are integral with and formed from the baffles 20 and 22. Preferably, in manufacture the brackets are punched out from the material forming the bracket to provide bearing surfaces onto which tray 26 bears. Brackets 27 can be configured in any one of a variety of different ways according to the supporting regime required for the cooking tray.

The barbeque as disclosed in the embodiment in FIG. 2 is folded in a similar manner to that previously described for the embodiment of FIG. 1.

Figure 9:
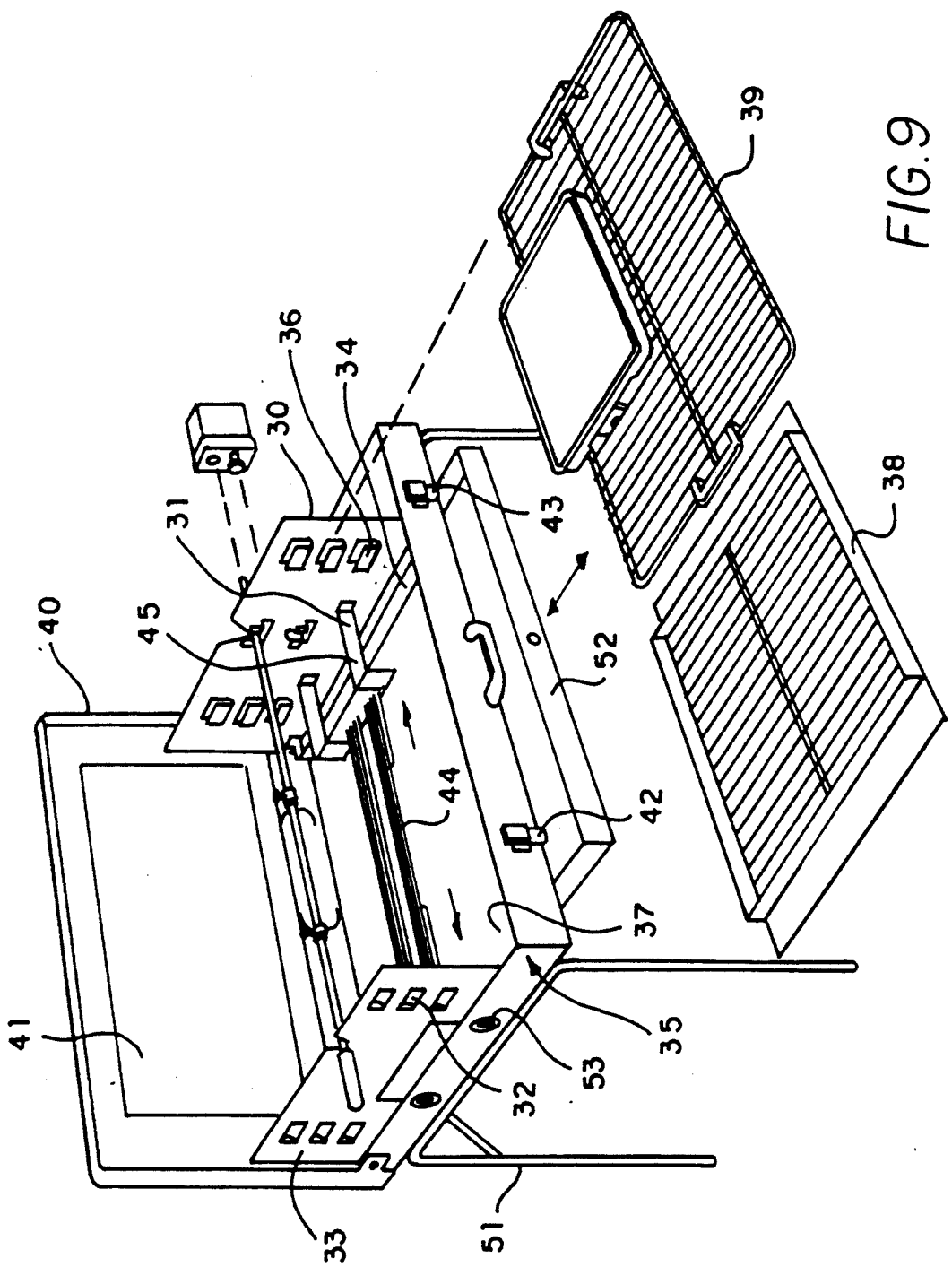
FIG. 9 shows a further exploded view of the barbeque assembly according to an alternative embodiment.

Referring to FIG. 9 there is shown an alternative exploded view of the barbeque assembly according to another embodiment of the invention.

In this view it can be seen that the baffle 30 is adapted with burner support bracket 31 which also acts to prevent unwanted rotation to a recumbent position of the baffle 30 when the barbeque is in operation. The baffles 30 and 33 are adapted with positively embossed brackets 36 to support cooking trays 38 and 39. The baffle 30 is adapted with a device to hold gas burners 44 in place. Furthermore, the baffles 30 and 33 fold into the recess 3 for more compact folding.

The baffles 30 and 33 shown in FIG. 9 are more rigid than baffles 20 and 22 shown in FIG. 2 in that they are designed to rotate only within a range of 0° to 90°. Baffle 30 is restrained from rotation to a recumbent position by bracket 45.

The barbeque of FIG. 9 is also adapted with a cover or lid 40 which is of one piece construction with embossing on the top surface 41 to provide rigidity of construction. The cover 40 is also adapted with lugs spot welded onto the inside front fold to allow latching via latches 42 and 43.

One advantage of the cover 40 is that it is adapted to rotate within a range 0° to 90° and therefore obviating the need to have a restraining device to prevent further movement of the cover during use. The barbeque is also adapted with a volcanic rock tray 30 made principally from steel rods fabricated into one piece and cooking tray 39. The barbeque is adapted with a safety edge around the periphery of the cooking area to contain all the volcanic rock therein. This is housed in recess 37.

Tray 39 has two foldable handles which facilitate its removal and also relocation at different cooking heights via brackets 36 on baffles 30 and 33 respectively. The gas burners which are utilized in cooking and designated 44, are conveniently fitted into gas cocks at one end (see figure 10) and dropped into a foldable cradle 45 at the other end, thus eliminating the need for rigid fixings.

Figure 10:
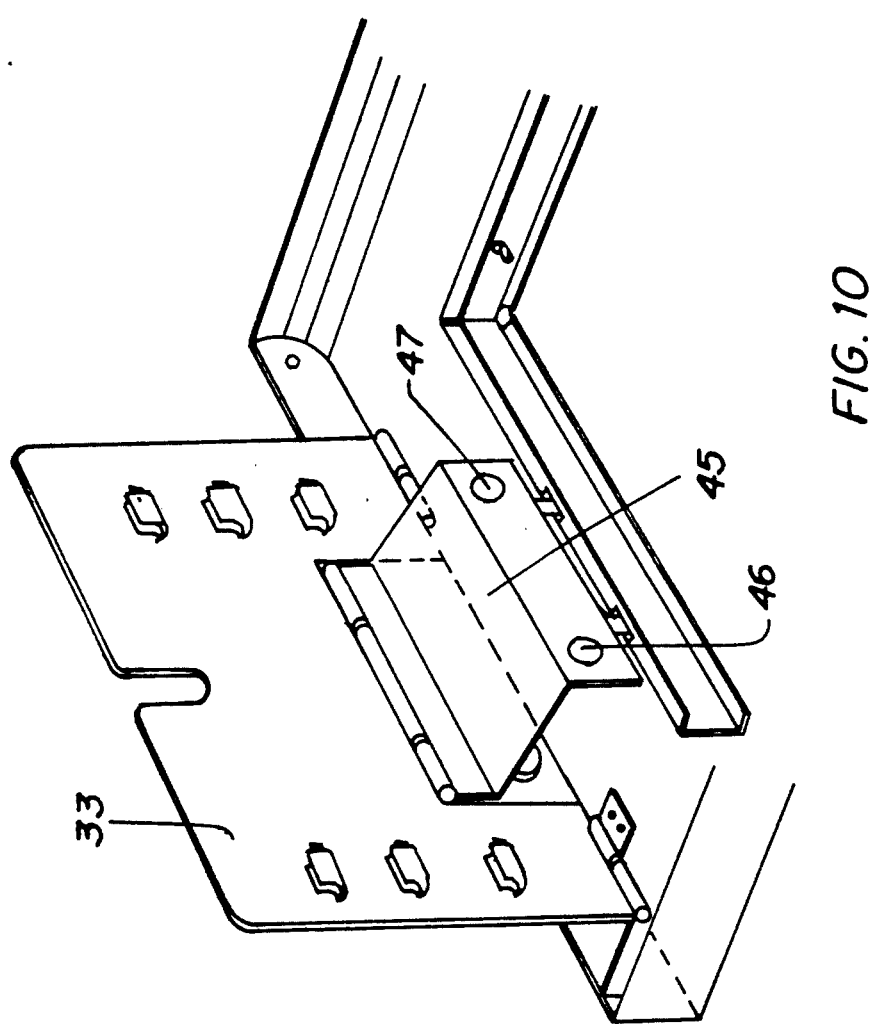
FIG. 10 shows an isometric view of the wind baffle and tray supports with a mechanism for holding and supporting a heat source.
Figure 11:
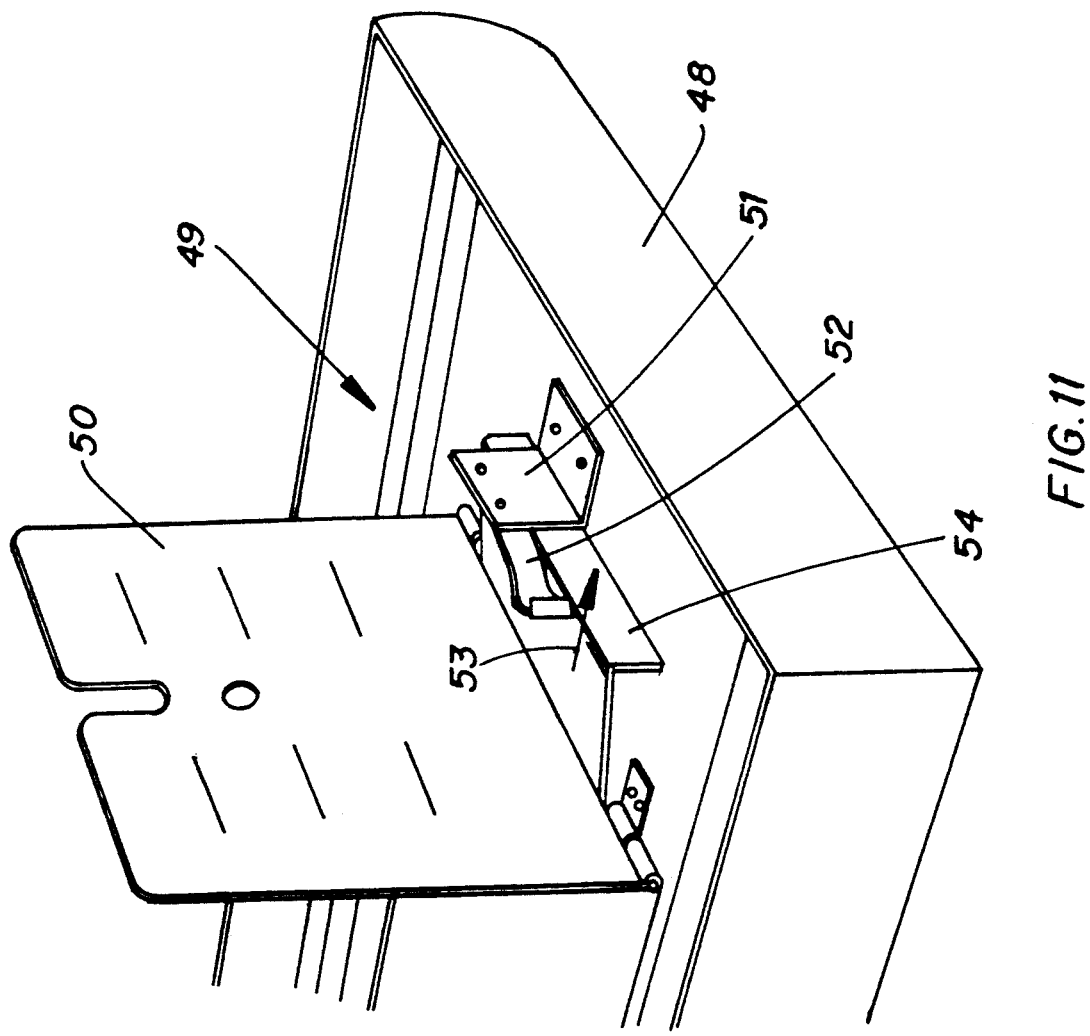
FIG. 11 shows the main tray of the barbeque with the wind baffle having a support against overturning.

FIG. 10 shows the means of support and connection of the baffle 33 by means of supporting bracket 45. Supporting bracket 45 is adapted with orifices 46 and 47 to receive the gas burner connecting elements. FIG. 11 shows an enlarged view of a typical baffle 50 at a spaced apart distance from the periphery of receptacle 48 of the barbeque this time with a rear engaging assembly 49 adapted to prevent backward rotation of baffle 50. The assembly 49 comprises a bracket 51 having mounted thereon a leaf spring 52 which initially retracts in the direction of arrow 53 then returns to engage a boss on restraining bracket 54.

Figure 12:
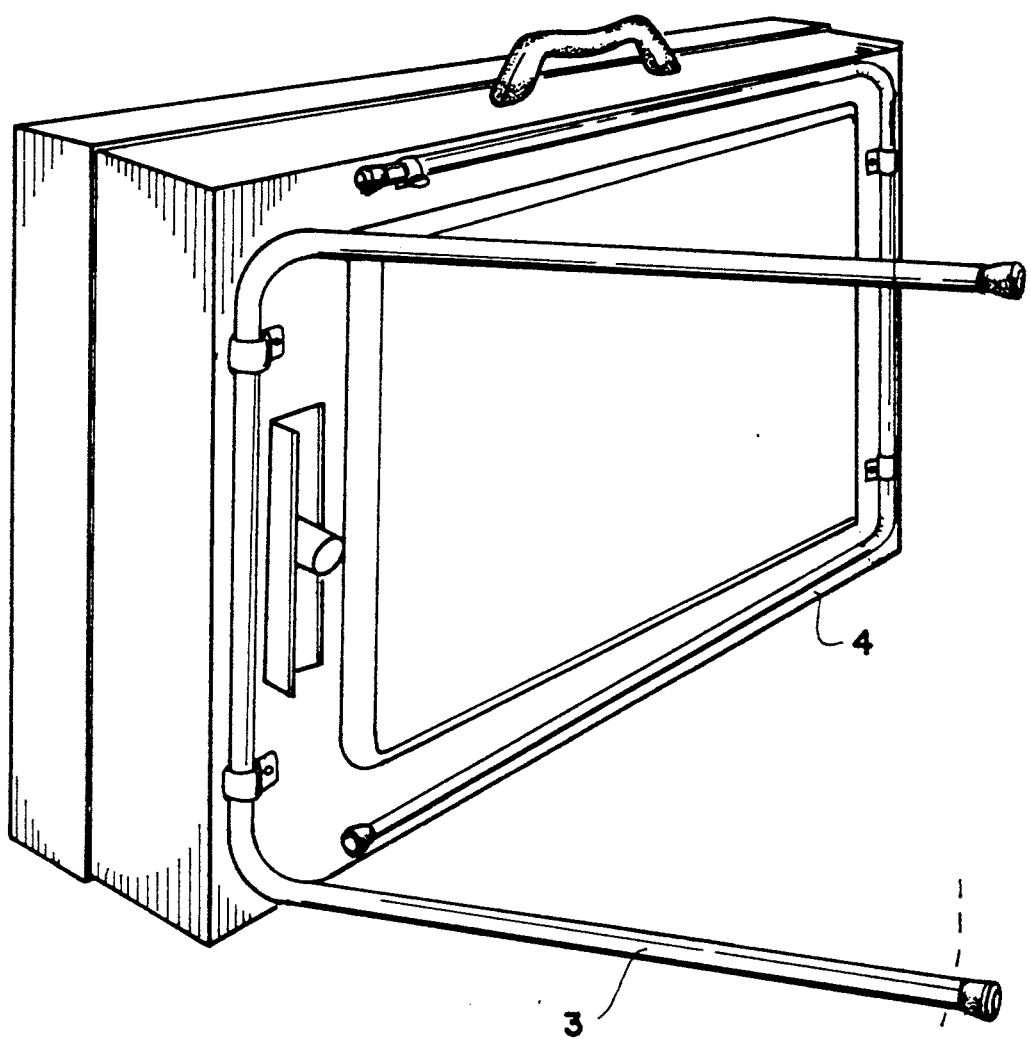
FIG. 12 shows an alternative embodiment of FIG. 8.

Referring to FIG. 12 there is shown a preferred embodiment of the barbeque assembly in the near folded configuration. The base of the assembly comprises two leg assemblies 3 and 4 preferrably made of steel tube bent into a substantial U-shape to provide stable support for the barbeque. This provides an alternative to a 90° leg connection with a gusset for bracing support, although the latter represents an alternative embodiment. The legs are in that embodiment stayed by means of collapsible stays 51 (see FIG. 9) to provide lateral rigidity and stability during use.

The barbeque is also adapted with a drip tray thereby providing an expedient means for collection and removal of waste. The drip tray is readily removable and this is shown in FIG. 9 and designated item 52. The utilitarian aspects of this tray prevent unwanted flare ups due to fat ignition as its configuration acts as a flame arrester if prepared in a manner conducive to flame retardation such as including sand in the tray.

The base of the barbeque has incorporated into it a facility to allow fats and waste products from cooking to drip properly into the drip tray. The metal edges around the opening in the base of the barbeque are made to cantilever and return down at approximately 30° so that fat will drip and land well into the tray.

The receptacle 35 of the barbeque as shown in FIG. 9 is also adapted with recessed control knobs 53, which are configured to avoid the likelihood of unwanted shearing off.

In the recess 37 of receptacle 35 there are two tabs at the rear formed inwards to act as a retainer for the sliding tray. These tabs perform when the unit is folded and in the carry position. The tray is held in position by the folds at the front of the barbeque and by the said two small tabs at the rear thus stopping the tray from collapsing inward and rattling whilst being carried.

The barbeque according to the embodiments of FIGS. 2 and 9 has covers or lids which have a center of gravity when in the opened position which is behind the pivot point of the lid so that there is little tendency for the cover to fall forwards towards the cooking area during use. Furthermore, because the center of gravity is behind the pivot point, the base configuration prevents the cover from opening any further than 90° relative to the base plane.

Figure 13:
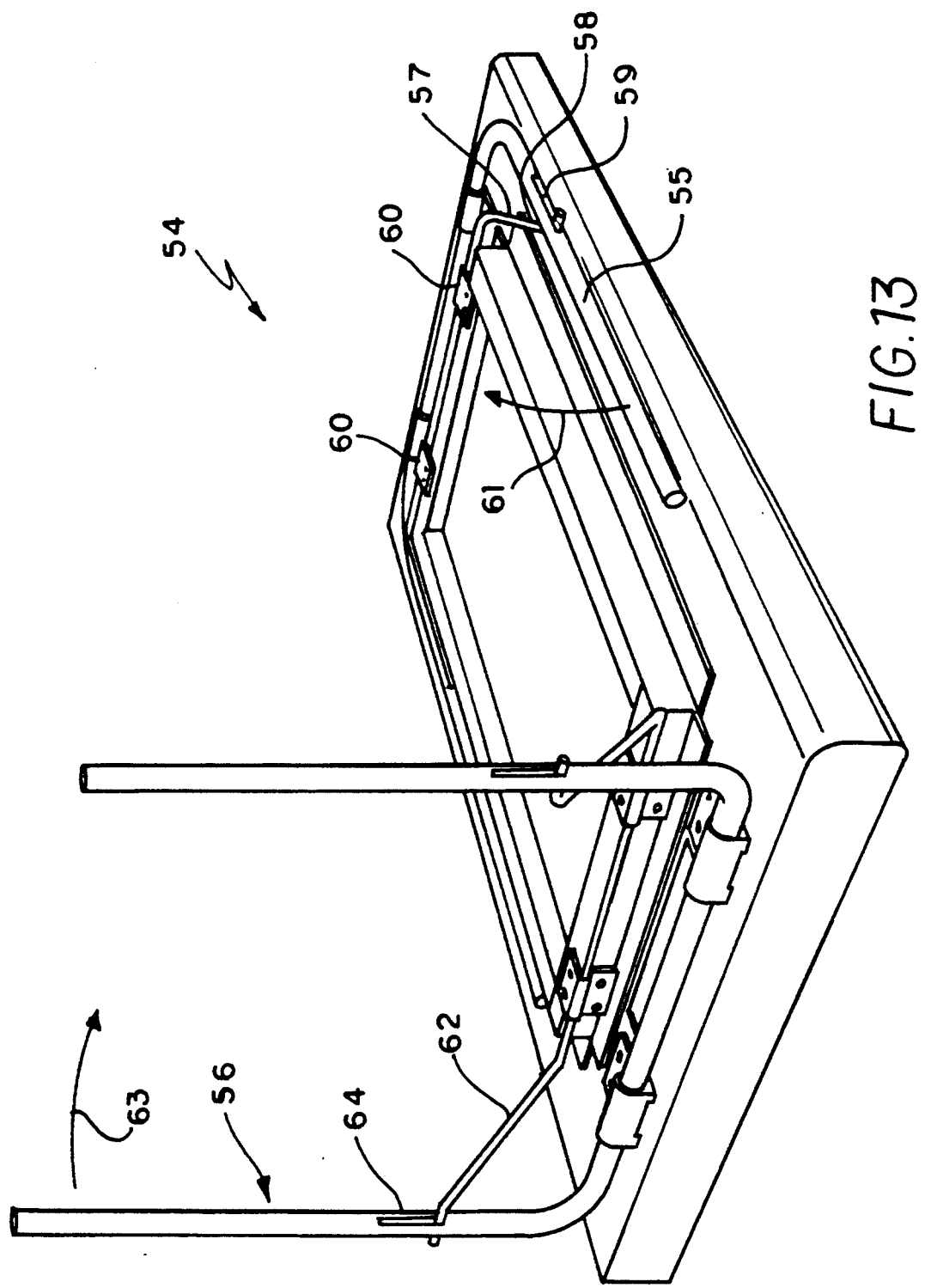
FIG. 13 shows an inverted view of the barbeque according to a preferred embodiment of the invention showing one method of folding the leg assemblies.

FIG. 13 shows an inverted view of a barbeque 54 having leg assembly 55 in the folded configuration and leg assembly 56 in the unfolded configuration. Each of the leg assembles have restraining bars to lock them into the folded configuration and restrain them in the open configuration. In the case of leg assembly 55, it is adapted with restraining bar 57 which has a return portion 58 which is adapted to slide in a slot 59 on each side of the leg assembly. Restraining bar 57 is anchored by means of anchorages 60 so as to enable the restraining bar to rotate when the leg assembly 55 is rotated in the direction of arrow 61 to place it in the open configuration when the leg assembly is in the open configuration. As is the case with leg assembly 56, the restraining bar 62 is shown bracing the leg assembly 56 in the unfolded configuration. When the leg assembly is to be folded in the direction of arrow 63, the restraining bar 62 rotates towards the center of the base as well as moving along slot 64 to facilitate the folding.

Figure 14:
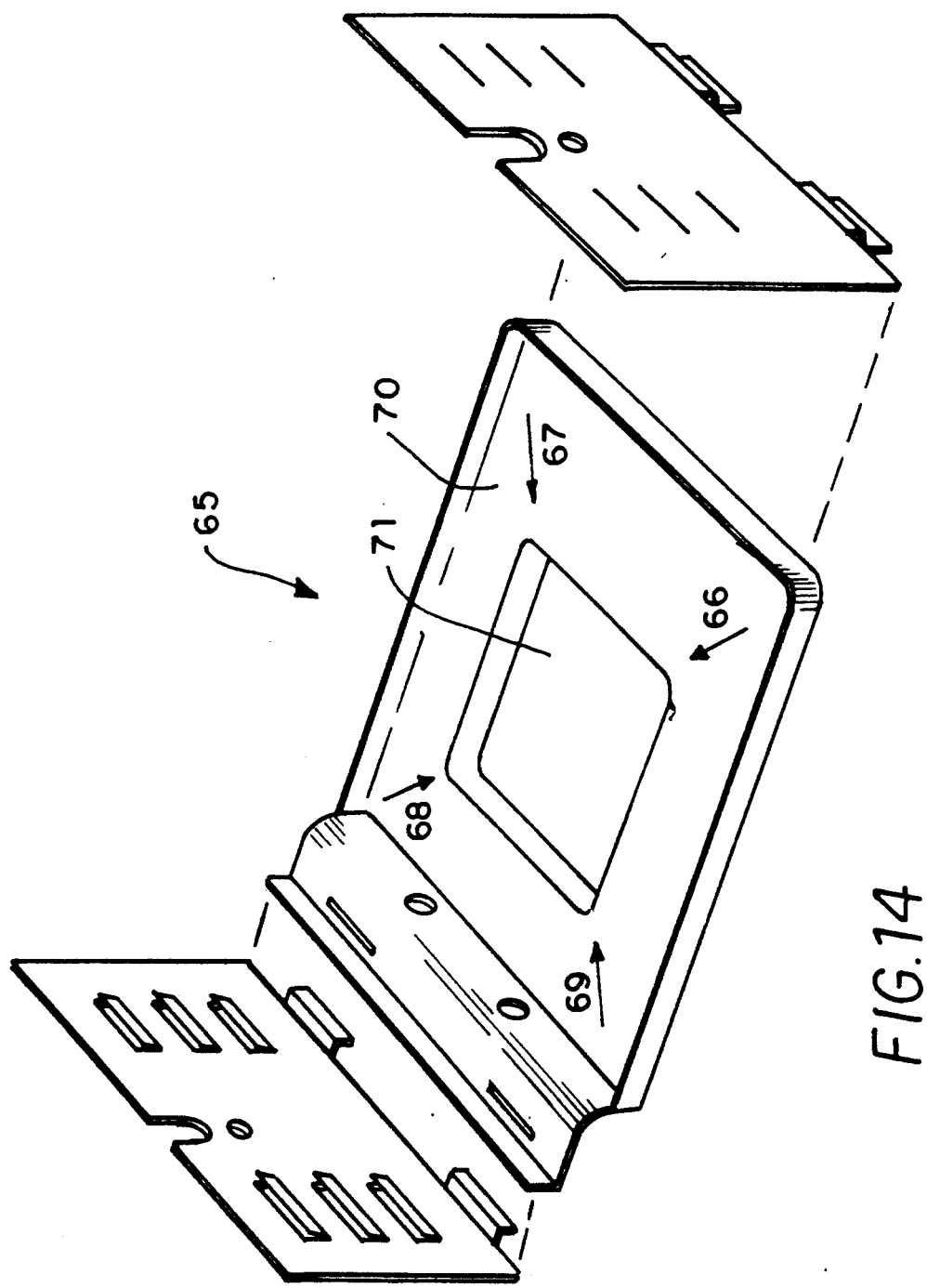
FIG. 14 shows an insert adapted to be placed within the receptacle in order to direct cooking waste into the cooking well according to one embodiment of the invention.

Referring to FIG. 14 there is shown an insert 65 adapted to be placed in receptacle 2 of the barbeque. The purpose of insert tray 65 is to channel cooking waste which travels in the direction of arrows 66, 67, 68 and 69 which may be deposited on or around the tray surface 70. Ideally, a slope is placed on the surface 70 in the direction of the opening 71 such that cooking waste can be channelled through the opening 71 and into the well in the receptacle 2. The insert tray 65 may be left in the barbeque when the barbeque is placed in the folded configuration.

It will be recognized by persons skilled in the art that numerous variations and modifications may be made to the present invention without departing from the overall spirit and scope of the invention as broadly described herein.

I claim:

1. A free standing collapsible, portable barbeque which is moved between a folded configuration, thereby assuming the character of a portable suitcase, and an assembled configuration; said barbeque comprising:

a substantially cubic receptacle including a base supported by legs pivotally attached to an underside of said base of said receptacle so that said legs fold inwardly to a plane parallel with the underside of said base of said receptacle, a lid pivotally connected to said receptacle which when open is a rear baffle and when closed is a cover for said receptacle, first and second side baffles which move independently of said lid, each of said side baffles being pivotally connected to said base of said receptacle adjacent a sidewall of the receptacle, a well formed within said receptacle defining a cooking waste trap, said well including a releasable drawer which forms a base in said well and when released, facilitates removal of cooking waste, supporting means on said first and second side baffles to provide adjustable support of one or more cooking trays or a rotisserie, means to enable an injection of a gas operated heat source or means to receive dry combustibles as a heat source within said receptacle, fastening means on said lid or receptacle to secure said receptacle when said barbeque is in the folded configuration.

2. A barbeque according to claim 1 wherein said first and second baffles have restraining supports to prevent rotation from a vertical disposition to a folded recumbent position when said baffles are positively placed in the assembled configuration.

3. A barbeque according to claim 2, including a restraining support on said first baffle comprising an angular plate having one leg connected to said first baffle and another leg engaging said base of the receptacle to provide restraint to maintain the vertical disposition.

4. A barbeque according to claim 3 wherein a restraining support on said second baffle comprises a bias actuated by manual movement of said second baffle.

5. A barbeque according to claim 4 wherein the first baffle when in the vertical disposition abuts the sidewall of said receptacle thereby providing restraint against rotation outward of the sidewall of the receptacle.

6. A barbeque according to claim 5 wherein the second baffle when in the vertical disposition is substantially in planar alignment with a sidewall of said well.

7. A barbeque according to claim 6 wherein the second baffle is restrained from rotation outward of the receptacle by a return at a base of said second baffle.

8. A barbeque according to claim 7 wherein the second baffle has a pivotally attached support for supporting a tray which spans between said first and second baffles.

9. A barbeque according to claim 8 wherein the said first and second baffles move between 0° and 90° from a recumbent to an upright position.

10. A barbeque according to claim 9 wherein said supporting means on the first and second baffles comprise angle brackets press formed from a material for said brackets.

11. A barbeque according to claim 10 wherein said legs further comprise two inverted U shaped sections; each said U shaped section having two legs, has an adjustable gusset brace on at least one of said legs of said U shaped sections which enables the legs to move between a folded and an unfolded configuration.

12. A barbeque according to claim 11 wherein said lid is pivotally attached to sidewalls of said receptacle via pivot pins.

13. A barbeque according to claim 11 wherein said receptacle includes a gas inlet port or ports for delivery of gas to said gas operated heat source within said receptacle.

14. A barbeque according to claim 13 wherein the said ports are operably controlled by control knobs fitted to a sidewall of said receptacle.

15. A barbeque according to claim 14 further comprising a tray fitted into said well and spanning thereacross, said try forming a second well via an insert tray to facilitate collection of cooking waste.

16. A barbeque according to claim 15 wherein the said bias comprises a leaf spring.

17. A barbeque according to claim 16 wherein the first and second baffles each comprise a slot at or near the top of each baffle to hold a motor operated rotisserie.

18. A barbeque according to claim 17 wherein said receptacle includes a carry handle and at least one clip on a front wall cooperating with said fastening means on said lid.

19. A barbeque according to claim 18 wherein said angle brackets are vertically spaced so as to allow cooking trays to be placed at selected elevations.

20. A barbeque according to claim 19 wherein said adjustable gusset brace is snap fit lockable via a sleeve.

21. A barbeque according to claim 20 wherein said legs have slots to facilitate sliding therewithin one end of said adjustable gusset brace and the other end of said adjustable gusset brace is connected to a wall of said well.

22. A barbeque according to claim 21 wherein the drawer in said well pulls out to the front.

23. A barbeque according to claim 22 wherein said lid has a board on an outer surface to enable playing a game of chess or draughts.

* * * * *